United States Patent
Le et al.

(10) Patent No.: US 11,928,042 B2
(45) Date of Patent: Mar. 12, 2024

(54) INITIALIZATION AND POWER FAIL ISOLATION OF A MEMORY MODULE IN A SYSTEM

(71) Applicant: Intel Corporation, Santa Clara, CA (US)

(72) Inventors: Dat T. Le, Tigard, OR (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 16/827,974

(22) Filed: Mar. 24, 2020

(65) Prior Publication Data

US 2020/0226045 A1    Jul. 16, 2020

(51) Int. Cl.
| | |
|---|---|
| *G06F 11/00* | (2006.01) |
| *G06F 1/30* | (2006.01) |
| *G06F 11/07* | (2006.01) |
| *G06F 11/30* | (2006.01) |
| *G06F 11/32* | (2006.01) |

(52) U.S. Cl.
CPC ............ *G06F 11/3058* (2013.01); *G06F 1/30* (2013.01); *G06F 11/0772* (2013.01); *G06F 11/0787* (2013.01); *G06F 11/3037* (2013.01); *G06F 11/327* (2013.01)

(58) Field of Classification Search
CPC ............ G06F 11/3058; G06F 11/0772; G06F 11/0787; G06F 11/3037; G06F 11/327
USPC .......................................................... 714/1–57
See application file for complete search history.

(56) References Cited

U.S. PATENT DOCUMENTS

| | | | |
|---|---|---|---|
| 6,735,660 B1 * | 5/2004 | Osten ................... | G06F 13/409 710/305 |
| 7,739,546 B1 * | 6/2010 | Rodrigues ........... | G06F 11/1662 714/13 |
| 2001/0042225 A1 * | 11/2001 | Cepulis ................ | G06F 11/073 714/25 |
| 2003/0115013 A1 * | 6/2003 | Dendinger ............. | G06F 1/206 702/132 |
| 2004/0153844 A1 * | 8/2004 | Ghose .................. | G06F 11/0727 714/42 |
| 2010/0205348 A1 * | 8/2010 | Moshayedi ........... | G06F 3/0634 711/E12.001 |
| 2017/0242819 A1 * | 8/2017 | Itkin ...................... | G06F 13/42 |
| 2018/0088658 A1 * | 3/2018 | McFarlane ............. | G06F 1/3296 |

* cited by examiner

*Primary Examiner* — Sarai E Butler
(74) *Attorney, Agent, or Firm* — Compass IP Law PC (57) ABSTRACT

A method and apparatus to detect, initialize and isolate a non-operating memory module in a system without physically removing the memory module from the system is provided. The memory module includes a power management integrated circuit to provide power to a memory integrated circuit on the memory module. During initialization of the memory module, if an error log stored in a non-volatile memory in the memory module indicates a fatal error condition from a prior power cycle, the memory module is electrically isolated.

20 Claims, 8 Drawing Sheets

INITIALIZATION AND POWER FAIL ISOLATION OF A MEMORY MODULE IN A SYSTEM

FIELD

This disclosure relates to memory modules and in particular to management of memory modules in a system.

BACKGROUND

A memory module is a printed circuit board on which memory integrated circuits ("chips") are mounted to another printed circuit board, such as a motherboard, via a connector (also referred to as a "socket"). The connector is installed on the motherboard and a memory module is inserted into the connector. The connector enables interconnection between a memory module and a circuit on the motherboard. A dual in-line memory module (DIMM) has separate electrical contacts on each side of the memory module.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A memory printed circuit board in a server in a data center can have a large number of DIMMs (for example, 16 or more) with each DIMM including a voltage regulator. If a voltage regulator in any of the DIMMs fails, it is often not practical or possible to remove the failed DIMM(s) and provide power to the other operational DIMMs. Instead of removing the DIMM(s) with a failed voltage regulator, during initialization of the server, DIMMs are initialized and failed DIMMs with a failed voltage regulator are electrically isolated.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
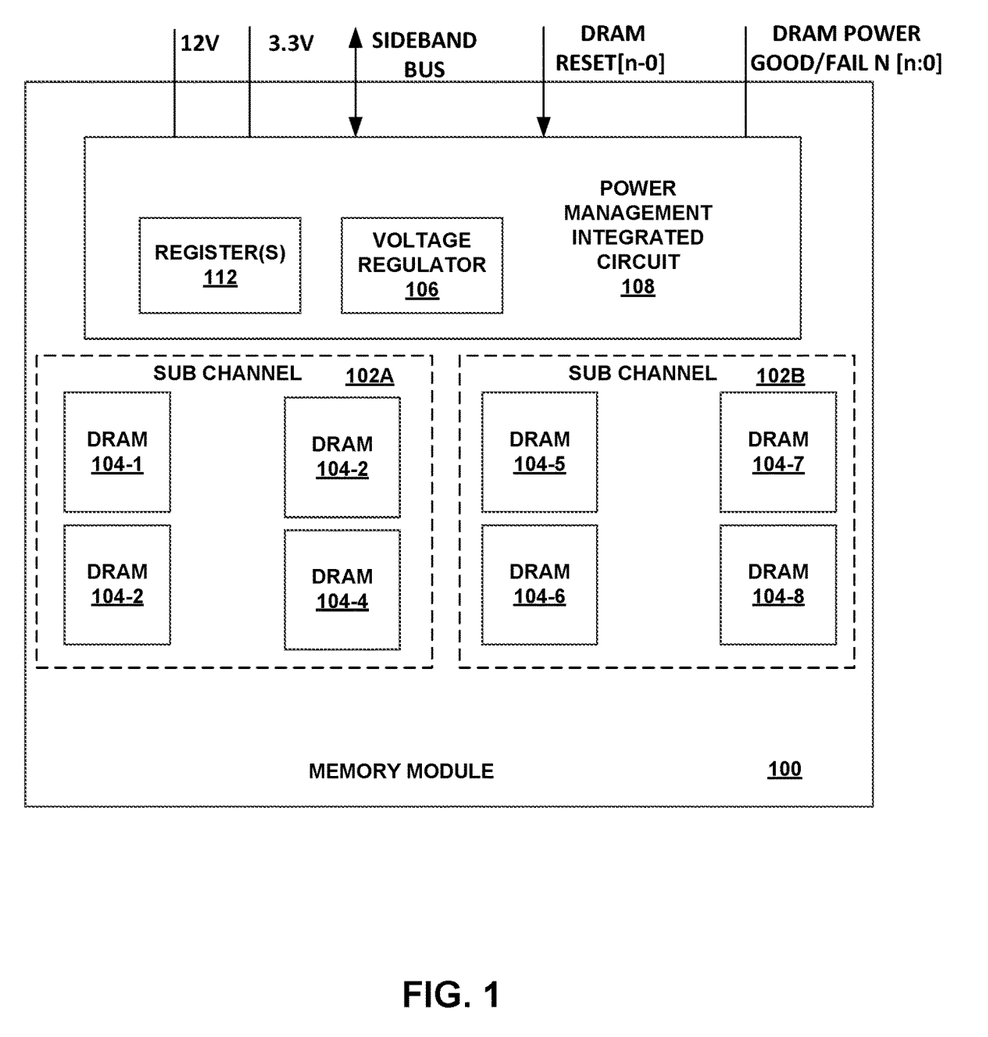
FIG. 1 is a block diagram of a memory module that includes a plurality of Dynamic Random Access Memory (DRAM) chips and a power management integrated circuit.

FIG. 1 is a block diagram of a memory module 100 that includes a plurality of Dynamic Random Access Memory (DRAM) chips 104-1, . . . , 104-8, and a power management integrated circuit 108. The memory module 100 has two sub channels 102a, 102b with four DRAM chips 104-1, . . . 104-4 in sub channel 102a and four DRAM chips 104-5, . . . 104-8 in sub channel 102b.

In other embodiments, there can be more than eight DRAM chips 104-1, . . . , 104-8 on the memory module 100. The power management integrated circuit 108 is assessed via a sideband bus, for example, an I2C or I3C serial management bus. The power management integrated circuit 108 includes a voltage regulator 106 and a type register 110. The type register 110 can be accessed via the sideband bus.

The memory module 100 receives power via a 12 volt (V) signal and a 3.3V signal from a power supply. The memory module 100 also includes DRAM RESET signals and DRAM POWER GOOD/FAIL signals that will be described later in conjunction with FIG. 3.

Figure 2:
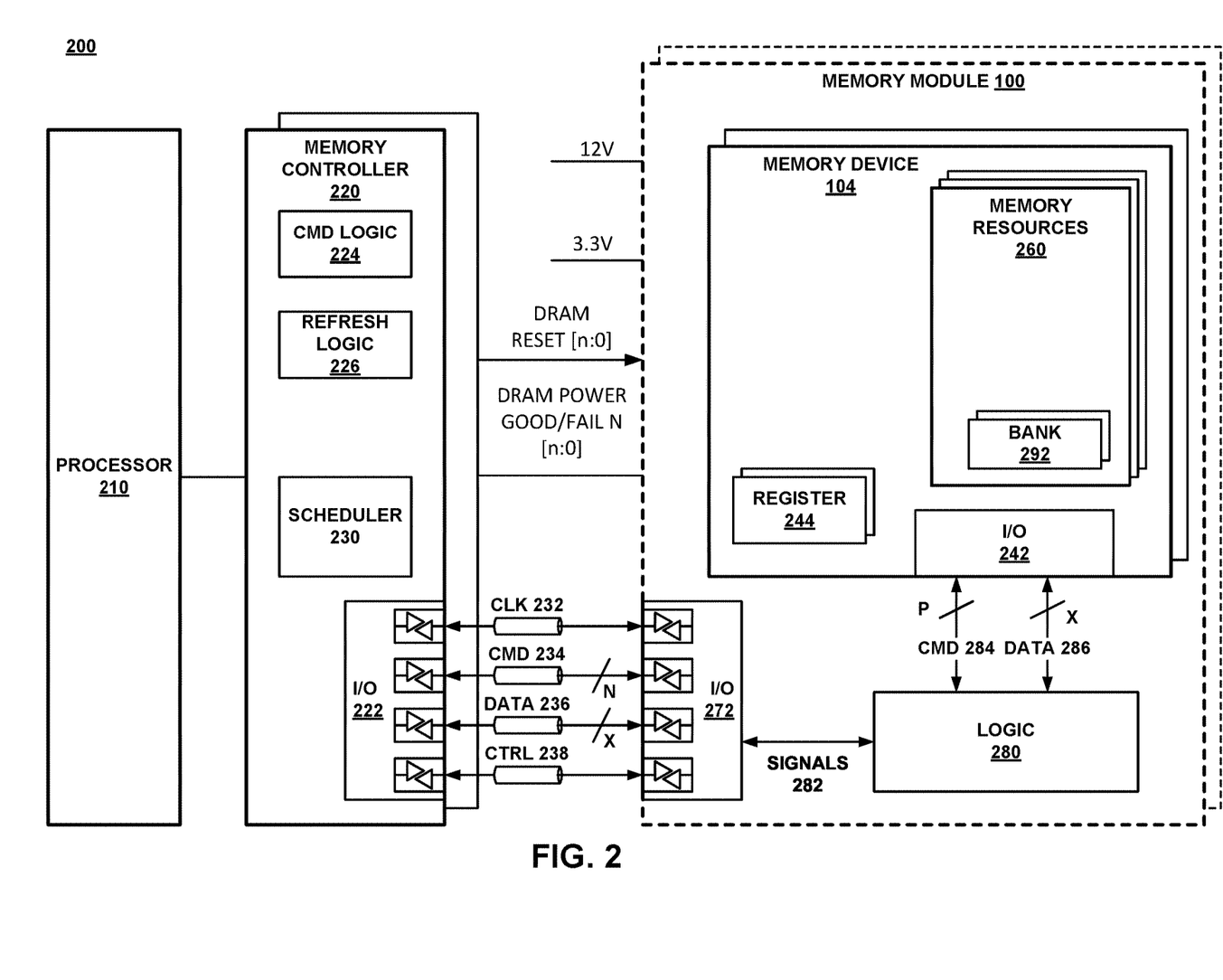
FIG. 2 is a block diagram of an embodiment of a system with a memory subsystem including at least one memory module coupled to a memory controller.

FIG. 2 is a block diagram of an embodiment of a system 200 with a memory subsystem including at least one memory module 100 coupled to a memory controller 220. System 200 includes a processor 210 and elements of a memory subsystem in a computing device. Processor 210 represents a processing unit of a computing platform that can execute an operating system (OS) and applications, which can collectively be referred to as the host or user of the memory. The OS and applications execute operations that result in memory accesses. Processor 210 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or storage controller. Such devices can be integrated with the processor in some systems (for example, in a System-on-Chip (SoC)) or attached to the processer via a bus (e.g., PCI express), or a combination.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WI02 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Memory controller 220 represents one or more memory controller circuits or devices for system 200. Memory controller 220 represents control logic that generates memory access commands in response to the execution of operations by processor 210. Memory controller 220 accesses one or more memory devices 104. Memory devices 104 can be DRAM devices 104-1, . . . 104-8 in accordance with any referred to above. Memory controller 220 includes I/O interface logic 222 to couple to a memory bus. I/O interface logic 222 (as well as I/O interface logic 242 of memory device 104) can include pins, pads, connectors, signal lines, traces, or wires, or other hardware to connect the devices, or a combination of these. I/O interface logic 222 can include a hardware interface. As illustrated, I/O interface logic 222 includes at least drivers/transceivers for signal lines. Commonly, wires within an integrated circuit interface couple with a pad, pin, or connector to interface signal lines or traces or other wires between devices. I/O interface logic 222 can include drivers, receivers, transceivers, or termination, or other circuitry or combinations of circuitry to exchange signals on the signal lines between the devices.

The exchange of signals includes at least one of transmit or receive. While shown as coupling I/O interface logic 222 from memory controller 220 to I/O interface logic 242 of memory device 104, it will be understood that in an implementation of system 200 where groups of memory devices 104 are accessed in parallel, multiple memory devices can include I/O interfaces to the same interface of memory controller 220. In an implementation of system 200 including one or more memory modules 100, I/O interface logic 242 can include interface hardware of the memory module in addition to interface hardware on the memory device itself. Other memory controllers 220 can include separate interfaces to other memory devices 104.

The bus between memory controller 220 and memory devices 104 can be a double data rate (DDR) high-speed DRAM interface to transfer data that is implemented as multiple signal lines coupling memory controller 220 to memory devices 104. The bus may typically include at least clock (CLK) 232, command/address (CMD) 234, and data (write data (DQ) and read data (DQO) 236, and zero or more control signal lines 238. In one embodiment, a bus or connection between memory controller 220 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for data (write DQ and read DQ) can be referred to as a "data bus." It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 220 and memory devices 104. An example of a serial bus technology is 8B10B encoding and transmission of high-speed data with embedded clock over a single differential pair of signals in each direction.

In one embodiment, one or more of CLK 232, CMD 234, Data 236, or control 238 can be routed to memory devices 104 through logic 280. Logic 280 can be or include a register or buffer circuit. Logic 280 can reduce the loading on the interface to I/O interface 222, which allows faster signaling or reduced errors or both. The reduced loading can be because I/O interface 222 sees only the termination of one or more signals at logic 280, instead of termination of the signal lines at every one or memory devices 104 in parallel. While I/O interface logic 242 is not specifically illustrated to include drivers or transceivers, it will be understood that I/O interface logic 242 includes hardware necessary to couple to the signal lines. Additionally, for purposes of simplicity in illustrations, I/O interface logic 242 does not illustrate all signals corresponding to what is shown with respect to I/O interface 222. In one embodiment, all signals of I/O interface 222 have counterparts at I/O interface logic 242. Some or all of the signal lines interfacing I/O interface logic 242 can be provided from logic 280. In one embodiment, certain signals from I/O interface 222 do not directly couple to I/O interface logic 242, but couple through logic 280, while one or more other signals may directly couple to I/O interface logic 242 from I/O interface 222 via I/O interface 272, but without being buffered through logic 280. Signals 282 represent the signals that interface with memory devices 104 through logic 280.

It will be understood that in the example of system 200, the bus between memory controller 220 and memory devices 104 includes a subsidiary command bus CMD 234 and a subsidiary data bus 236. In one embodiment, the subsidiary data bus 236 can include bidirectional lines for read data and for write/command data. In another embodiment, the subsidiary data bus 236 can include unidirectional write signal lines for write and data from the host to memory, and can include unidirectional lines for read data from the memory device 104 to the host. In accordance with the chosen memory technology and system design, control signals 238 may accompany a bus or sub bus, such as strobe lines DQS. Based on design of system 200, or implementation if a design supports multiple implementations, the data bus can have more or less bandwidth per memory device 104. For example, the data bus can support memory devices 104 that have either a x32 interface, a x16 interface, a x8 interface, or another interface. The convention "xW," where W is an integer that refers to an interface size or width of the interface of memory device 104, which represents a number of signal lines to exchange data with memory controller 220. The number is often binary, but is not so limited. The interface size of the memory devices is a controlling factor on how many memory devices can be used concurrently in system 200 or coupled in parallel to the same signal lines. In one embodiment, high bandwidth memory devices, wide interface devices, or stacked memory configurations, or combinations, can enable wider interfaces, such as a x128 interface, a x256 interface, a x512 interface, a x1024 interface, or other data bus interface width.

Memory devices 104 represent memory resources for system 200. In one embodiment, each memory device 104 is a separate memory die. Each memory device 104 includes I/O interface logic 242, which has a bandwidth determined by the implementation of the device (e.g., x16 or x8 or some other interface bandwidth). I/O interface logic 242 enables each memory device 104 to interface with memory controller 220. I/O interface logic 242 can include a hardware interface, and can be in accordance with I/O interface logic 222 of memory controller 220, but at the memory device end. In one embodiment, multiple memory devices 104 are connected in parallel to the same command and data buses. In another embodiment, multiple memory devices 104 are connected in parallel to the same command bus, and are connected to different data buses. For example, system 200 can be configured with multiple memory devices 104 coupled in parallel, with each memory device responding to a command, and accessing memory resources 260 internal to each. For a write operation, an individual memory device 104 can write a portion of the overall data word, and for a read operation, an individual memory device 104 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word are provided or received by other memory devices in parallel.

In one embodiment, memory devices 104 can be organized into memory modules 100. In one embodiment, memory modules 100 represent dual inline memory modules (DIMMs. Memory modules 100 can include multiple memory devices 104, and the memory modules can include support for multiple separate channels to the included memory devices disposed on them.

Memory devices 104 each include memory resources 260. Memory resources 260 represent individual arrays of memory locations or storage locations for data. Typically, memory resources 260 are managed as rows of data, accessed via word line (rows) and bit line (individual bits within a row) control. Memory resources 260 can be organized as separate banks of memory. Banks may refer to arrays of memory locations within a memory device 104. In one embodiment, banks of memory are divided into sub-banks with at least a portion of shared circuitry (e.g., drivers, signal lines, control logic) for the sub-banks.

In one embodiment, memory devices 104 include one or more registers 244. Register 244 represents one or more storage devices or storage locations that provide configuration or settings for the operation of the memory device. In one embodiment, register 244 can provide a storage location for memory device 104 to store data for access by memory controller 220 as part of a control or management operation. In one embodiment, register 244 includes one or more Mode Registers. In one embodiment, register 244 includes one or more multipurpose registers. The configuration of locations within register 244 can configure memory device 104 to operate in different "mode," where command information can trigger different operations within memory device 104 based on the mode. Additionally, or in the alternative, different modes can also trigger different operation from address information or other signal lines depending on the mode. Settings of register 244 can indicate configuration for I/O settings (e.g., timing, termination, driver configuration, or other I/O settings).

Memory controller 220 includes scheduler 230, which represents logic or circuitry to generate and order transactions to send to memory device 104. From one perspective, the primary function of memory controller 220 is to schedule memory access and other transactions to memory device 104. Such scheduling can include generating the transactions themselves to implement the requests for data by processor 210 and to maintain integrity of the data (e.g., such as with commands related to refresh).

Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 220 typically includes logic to allow selection and ordering of transactions to improve performance of system 200. Thus, memory controller 220 can select which of the outstanding transactions should be sent to memory device 104 in which order, which is typically achieved with logic much more complex that a simple first-in first-out algorithm. Memory controller 220 manages the transmission of the transactions to memory device 104, and manages the timing associated with the transaction. In one embodiment, transactions have deterministic timing, which can be managed by memory controller 220 and used in determining how to schedule the transactions.

Referring again to memory controller 220, memory controller 220 includes command (CMD) logic 224, which represents logic or circuitry to generate commands to send to memory devices 104. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 104, memory controller 220 can issue commands via I/O 222 to cause memory device 104 to execute the commands. Memory controller 220 can implement compliance with standards or specifications by access scheduling and control.

Referring again to logic 280, in one embodiment, logic 280 buffers certain signal 282 from the host to memory devices 204. In one embodiment, logic 280 buffers data signal lines 236 as data 286, and buffers command (or command and address) lines of CMD 234 as CMD 284. In one embodiment, data 286 is buffered, but includes the same number of signal lines as data 236. Thus, both are illustrated as having X signal lines. In contrast, CMD 234 has fewer signal lines than CMD 284. Thus, P>N. The N signal lines of CMD 234 are operated at a data rate that is higher than the P signal lines of CMD 284. For example, P can equal 2N, and CMD 284 can be operated at a data rate of half the data rate of CMD 234.

In one embodiment, memory controller 220 includes refresh logic 226. Refresh logic 226 can be used for memory resources 160 that are volatile and need to be refreshed to retain a deterministic state. In one embodiment, refresh logic 226 indicates a location for refresh, and a type of refresh to perform. Refresh logic 226 can execute external refreshes by sending refresh commands. For example, in one embodiment, system 200 supports all bank refreshes as well as per bank refreshes. All bank refreshes cause the refreshing of a selected bank 292 within all memory devices 104 coupled in parallel. Per bank refreshes cause the refreshing of a specified bank 292 within a specified memory device 104.

System 200 can include a memory circuit, which can be or include logic 280. To the extent that the circuit is considered to be logic 280, it can refer to a circuit or component (such as one or more discrete elements, or one or more elements of a logic chip package) that buffers the command bus. To the extent the circuit is considered to include logic 280, the circuit can include the pins of packaging of the one or more components, and may include the signal lines. The memory circuit includes an interface to the N signal lines of CMD 234, which are to be operated at a first data rate. The N signal lines of CMD 234 are host-facing with respect to logic 280. The memory circuit can also include an interface to the P signal lines of CMD 284, which are to be operated at a second data rate lower than the first data rate. The P signal lines of CMD 284 are memory-facing with respect to logic 280. Logic 280 can either be considered to be the control logic that receives the command signals and provides them to the memory devices, or can include control logic within it (e.g., its processing elements or logic core) that receive the command signals and provide them to the memory devices.

Figure 3:
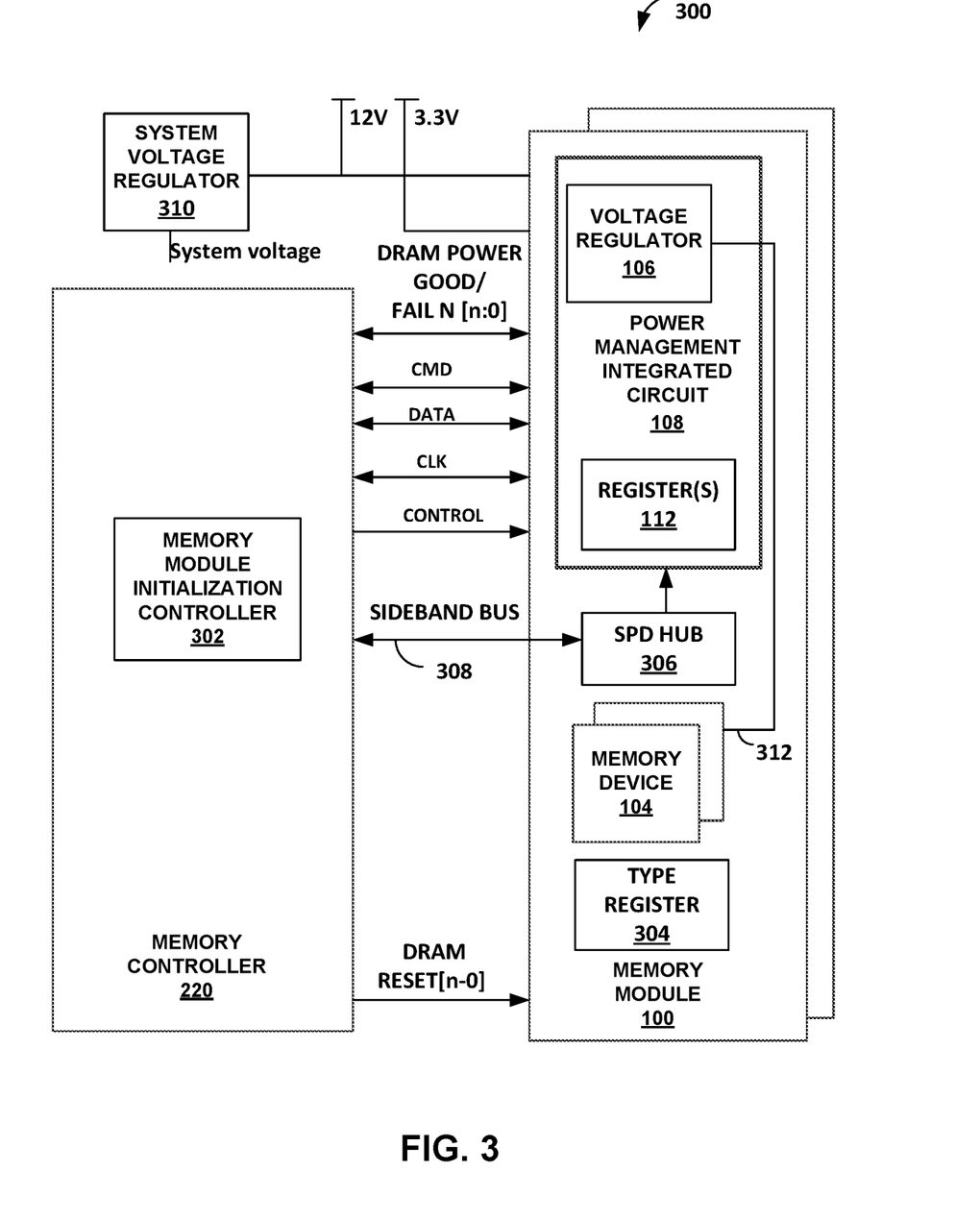
FIG. 3 is a block diagram illustrating the interface between the memory controller and a memory module to initialize the memory module and to electrically isolate the memory module upon detecting that the memory module has failed.

FIG. 3 is a block diagram illustrating the interface between the memory controller 220 and a memory module 100 to initialize the memory module 100 and to electrically isolate the memory module 100 upon detecting that the voltage regulator 106 in the memory module 100 has failed. As discussed in conjunction with FIG. 1, the memory module 100 has a power management integrated circuit 108 and at least one memory device 104. The register(s) 110 in the power management integrated circuit 108 include one or more error log register(s). The error log register(s) in registers 112 are stored in non-volatile memory on the memory module 100. The memory module 100 also includes a type register 304 to store the type of memory module. The memory controller 220 and the memory module 100 are communicatively coupled via a sideband bus 308, for example, an I2C or I3C serial management bus. During initialization, the memory module initialization controller 302 in the memory controller 220 communicates with a Serial Presence Detect (SPD) hub 306 in the memory module 100 via the sideband bus 308. In an embodiment, the Serial Presence Detect hub 306 is an electrically erasable programmable read only memory that stores configuration information.

The power management integrated circuit 108 is protected against catastrophic failures by configuring failure thresholds (for example, over current and over temperature) in registers 112. Non-catastrophic conditions are reported and managed through the sideband bus 308. The power management integrated circuit 108 supports full telemetry (for example, power metering, output rails and temperature) via polling over the sideband bus 308.

The DRAM Power Good/Fail signal is a tri-state signal that is shared by memory modules 100. A tri-state signal has three states: high-impedance, 0 and 1. The state of the DRAM Power Good/Fail signal can be changed to indicate power failure of a memory module 100 or a system voltage regulator 310 coupled to the DRAM Power Good/Fail signal. Upon detection of a failure of the memory module 100 via the DRAM Power Good/Fail signal, the system asserts a reset signal.

In response to assertion of the reset signal, the bus communicatively coupled between the memory controller 220 and the memory module 100 is tri-stated. All memory modules 100 that are communicatively coupled to the same DRAM Power Good/Fail signal disable output signals and the power management integrated circuit 108 writes (logs) the error in the error logs in register(s) 112 in non-volatile memory on the memory module 100. After the error has been logged, the system 200 shuts down.

Fault isolation of the failed memory module 100 is performed during a subsequent system boot-up. In an embodiment, the fault isolation is performed by firmware used to perform hardware initialization in the system during the booting process, for example by Basic Input/Output System (BIOS) firmware. The state (failed/operational) of the memory module 100 can be read by firmware from the error logs in registers 112 or can be detected via the state of the DRAM Power Good/Fail signal. In an embodiment, the power management integrated circuit 108 in the failed memory module 100 drives the signal low to indicate that the memory module 100 has failed. The DRAM Power Good/Fail signal is connected to multiple memory modules 100 in the system. The minimum granularity for fault isolation of a failed memory module is a channel and there can be two memory modules per channel. If one of the memory modules in the channel has failed, both memory modules are disabled due to interdependency between the memory modules, for example, one memory module 100 can provide On Die Termination (ODT) for the other memory module 100.

Figure 4:
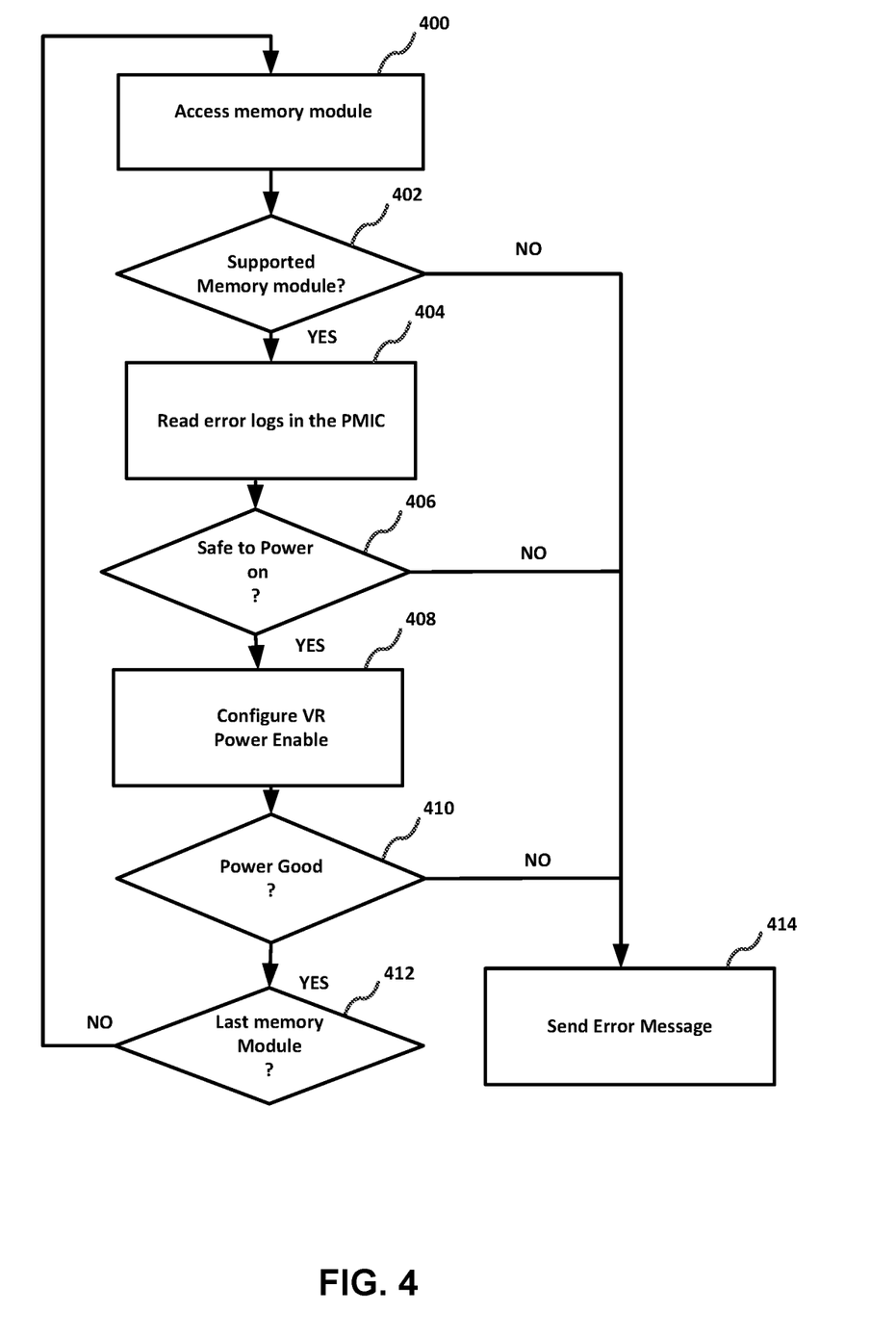
FIG. 4 is a flowgraph illustrating a method to initialize the memory module.

FIG. 4 is a flowgraph illustrating a method to initialize the memory module 100 after power is applied to the system.

At block 400, during initialization, after power is applied to the system 200, the memory controller 220 reads the type register 304 in non-volatile memory in the memory module 100 via the sideband bus 308 to determine the type of the memory module 100. For example, the type of memory module 100 can be a registered dual in line memory module (RDIMM), an unregistered dual in line memory module (UDIMM) (also referred to unbuffered DIMM) or a Non-Volatile memory DIMM (NVDIMM). The system 200, for example, a server may not support an unregistered dual in line memory module. Processing continues with block 402.

At block 402, if the type of memory module read from the type register 304 on the memory module 100 is supported by the memory controller 220, processing continues with block 404. If not, processing continues with block 414.

At block 404, the memory controller 220 reads via the sideband bus 308 one or more error logs stored in registers 112 in the power management integrated circuit 108 in the memory module 100. Processing continues with block 406.

At block 406, the state of bits in the one or more error logs stored in registers 112 indicate if an error was detected prior to the last power down of the system 200. Examples of logged errors include transient errors, for example, over temperature, over current, and over/under voltage. If the error logs stored in registers 112 indicate that there was a catastrophic/fatal error, it is not safe for the power management integrated circuit 108 to provide power to the memory devices 104 and other circuitry on the memory module 100, processing continues with block 414. If not, processing continues with block 408.

At block 408, the memory controller 220 sends a voltage regulator enable command (also referred to as an enable power request) via the sideband bus 308 to enable the voltage regulator 106 in the power management integrated circuit 108 on the memory module 100. Power is provided by voltage regulator 106 on power rail(s) 312 to memory device(s) 104. Processing continues with block 410.

At block 410, tri-state DRAM Power Good/Fail signal(s) can be shared by a plurality of memory modules 100 in the system and used to isolate a failed memory module 100, if the state of the DRAM Power Good/Fail signal(s) indicate that power is good, processing continues with block 412. All of the memory modules 100 that share DRAM Power Good/Fail signal(s) (also referred to as a shared control signal group of memory modules) must report power good. If power is good, the memory module 100 drives its DRAM Power Good/Fail output signal(s) (also referred to as a tri-state power good signal) to high impedance (hi-Z). The initialization sequence can be performed in parallel using multiple sideband buses 308 to speed up the power-on process for the memory modules 100 in the system. If power is not good, processing continues with block 414.

At block 412, if there are other memory modules 100 in the system 200 to be initialized, processing continues with block 402 to initialize the next memory module.

At block 414, an error message indicating that an error occurred during initialization of the memory module 100 can be accessed by the memory controller 220 via the sideband bus 308.

Figure 5A:
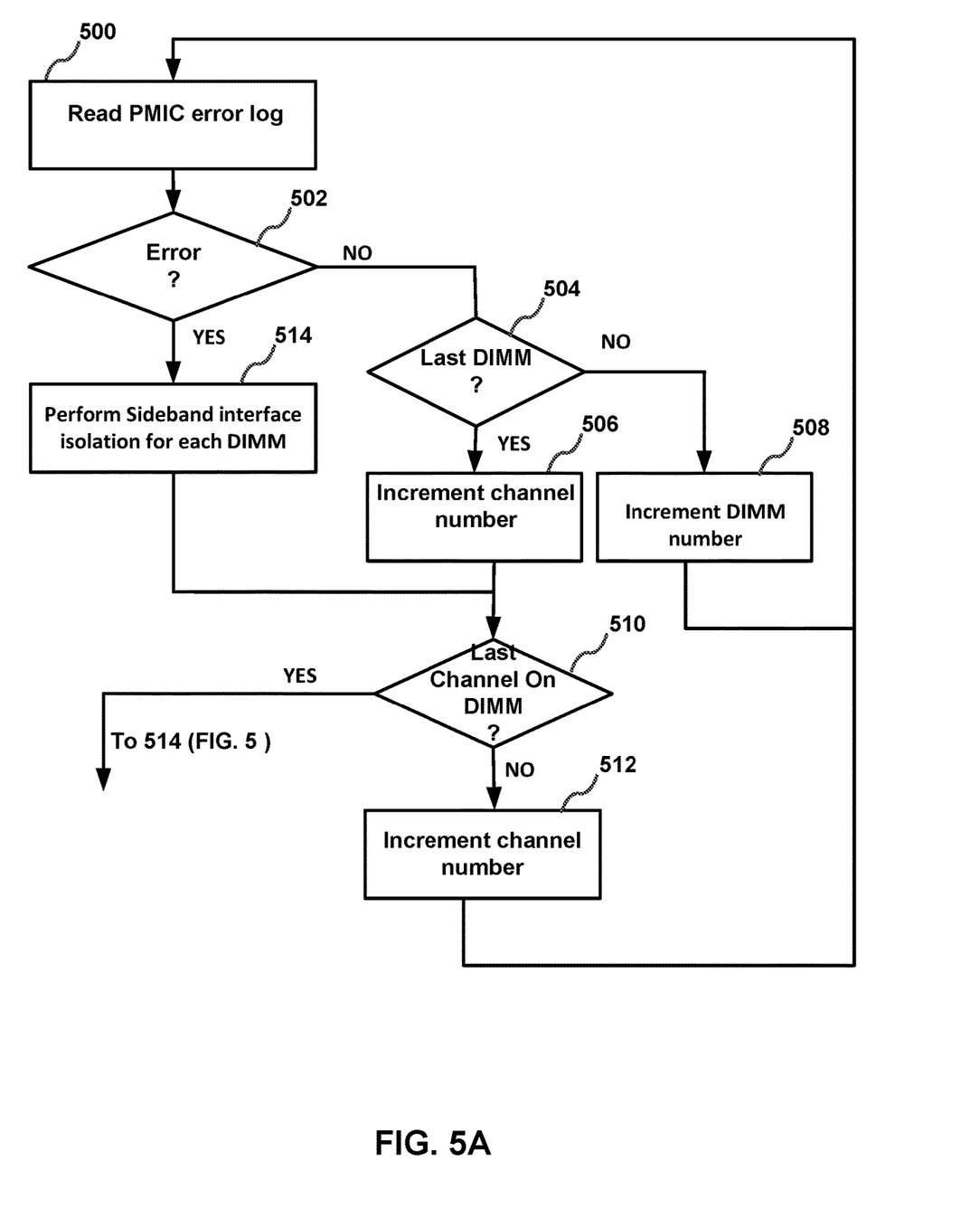
FIGS. 5A-5C is a flowgraph illustrating a method to perform failure isolation of a failed memory module.
Figure 5B:
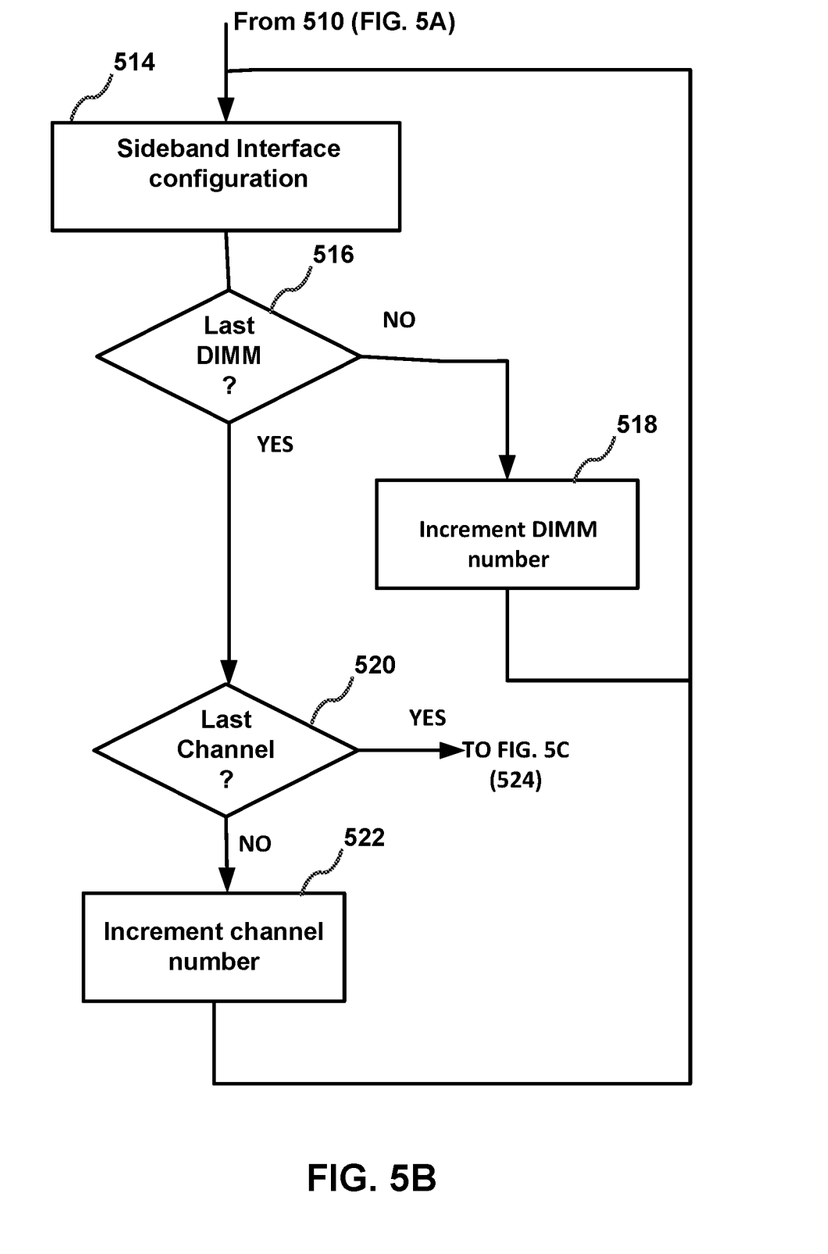
Figure 5C:
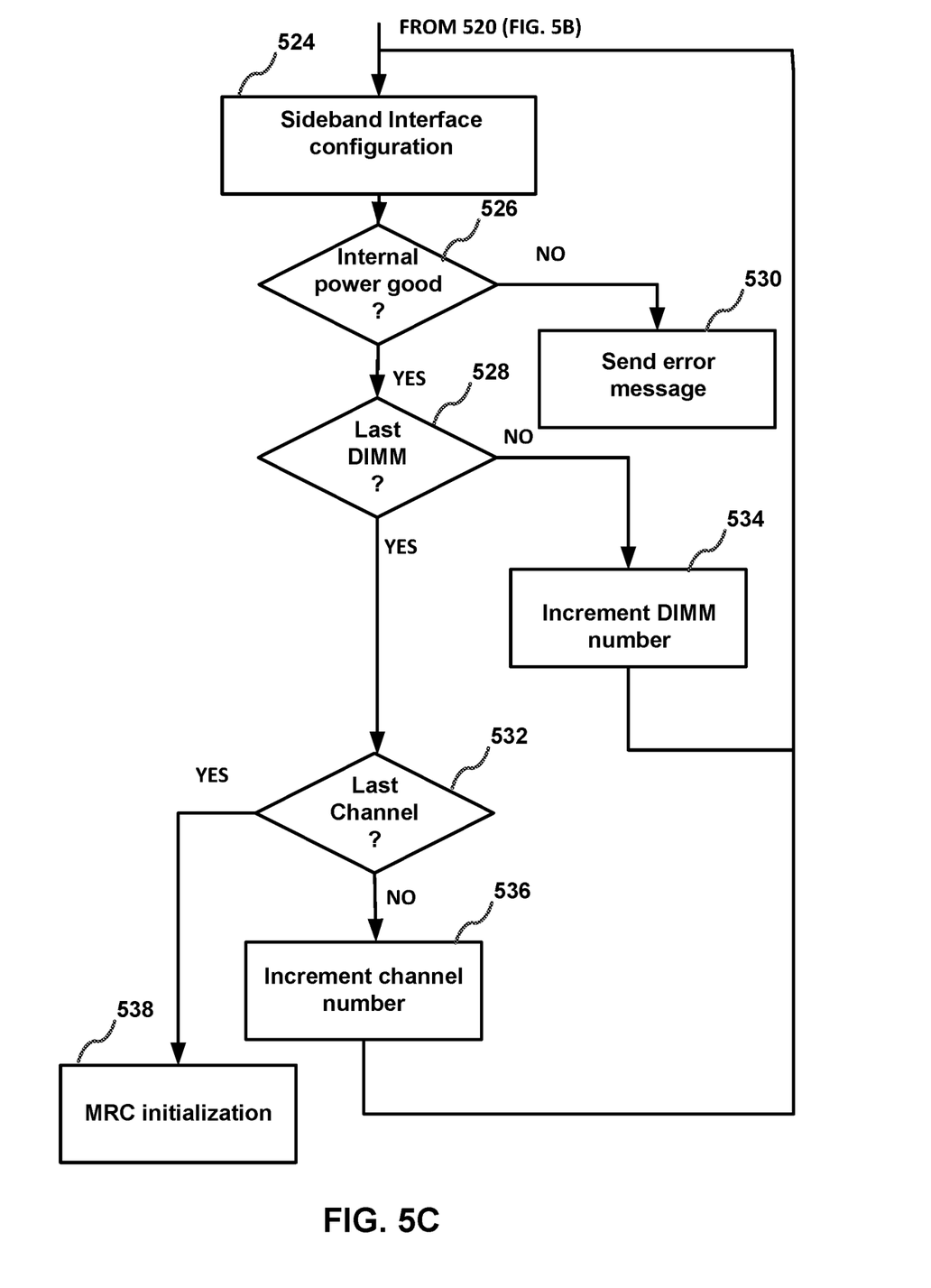

FIGS. 5A-5C is a flowgraph illustrating a method to perform failure isolation of a failed memory module 100. In the embodiment discussed in conjunction with FIGS. 5A-5C, the memory module 100 is a Dual In-line Memory Module (DIMM).

FIG. 5A illustrates a method to isolate a failing DIMM and the failing s associated functional DIMM in a same channel. FIG. 5B illustrates a method to enable the operational DIMMs in the system. FIG. 5C illustrates a method to perform another check of the status of the power management integrated circuit in each of the operational DIMMs in the system after the operational DIMMs have been powered on.

Turning to FIG. 5A, at block 500, one or more of error log registers in registers 112 in the power management integrated circuit 108 are read to obtain power fail status of the memory module 100. Processing continues with block 502.

At block 502, if a fatal error is read from the error log registers, processing continues with block 514.

At block 504, a fatal error has not been logged and the DIMM is not the last MAI in the system, processing continues with block 506. If not, processing continues with block 508.

At block 506, the channel number is incremented. Processing continues with block 510.

At block 508, the DIMM number is incremented. Processing continues with block 500 to read the error log registers in the next MINI At block 510, if the channel is the last channel, processing continues with block 514. If not, processing continues with block 512.

At block 512, the channel number is incremented. Processing continues with block 500.

Turning to FIG. 5B, at block 514, the current DIMM is configured via the sideband bus 308. In an embodiment, the current DIMM is enabled by setting one or more bits in the registers 112 to achieve secure mode. Secure mode ensures that after an operational DIMM has been powered on, the operational DIMM cannot be disabled while powered on. Processing continues with block 516.

At block 516, if the DIMM is not the last DIMM in the system, processing continues with block 520. If not, processing continues with block 518.

At block 518, the number of the DIMM is incremented to configure the next MAL Processing continues with block 514.

At block 520, if the channel is the last channel on the last DIMM in the system, processing continues with block 524 (FIG. 5C). If not, processing continues with block 522.

At block 522, the channel number is incremented. Processing continues with block 514 to configure the next channel on the DIMM.

Turning to FIG. 5C, each working DIMM has been configured to supply power to the memory devices on the DIMM. The BIOS checks the status of the power management integrated circuit 108 in each working DIMM after the DIMM has been enabled (that is, power is supplied to the memory devices on the DIMM). The status is checked to ensure that each of the DIMMs in the system has completed its power-on sequence (that is, the power good signal is asserted low) before the system is in the linked mode. In linked mode, if one of the DIMMs that shares DRAM Power Good/Fail signal(s) does not report power good, power is removed from all of the DIMMs.

At block 524, a status check of all the working DIMMs to which power has been supplied is initiated via a command sent from the memory controller 220 via the sideband bus 308. Processing continues with block 526.

At block 526, one of the registers 112 in the power management integrated circuit 108 is read to obtain the status of the internal power. If the status indicates that the internal power is good, processing continues with block 528. If not, processing continues with block 530.

At block 528, if the DIMM is the last DIMM in the system processing continues with block 532. If not, processing continues with block 534.

At block 530, an error message is sent via the sideband bus 308 to the memory controller 220, In response to the error message, power to the DIMM is removed. Processing is complete.

At block 532, if the channel is the last channel on the DIMM, processing continues with block 538. If not, processing continues with block 536.

At block 534, the DIMM number is incremented and processing continues with block 524.

At block 536, the channel number is incremented, processing continues with block 524.

At block 538, memory initialization is performed in the memory in the working DIMMs in the system. Processing is complete.

Figure 6:
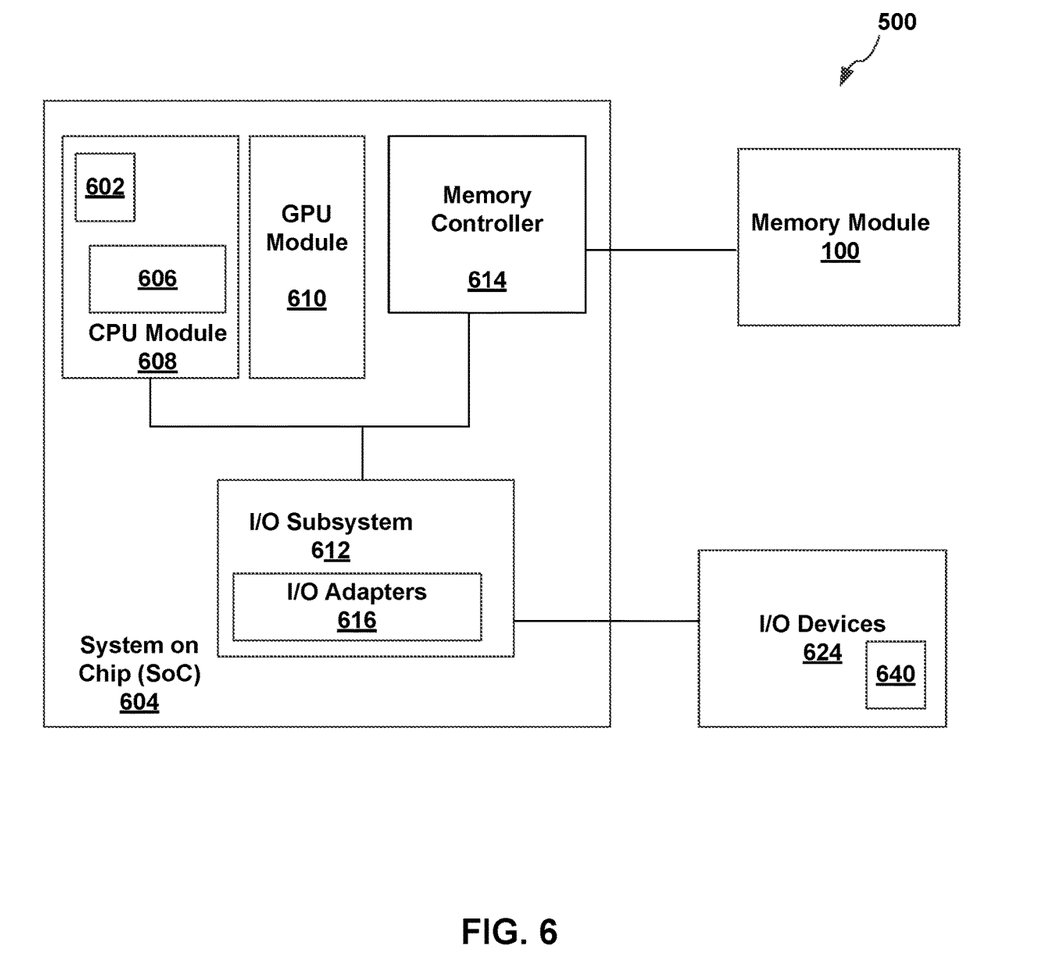
FIG. 6 is a block diagram of an embodiment of a computer system that includes the memory module.

FIG. 6 is a block diagram of an embodiment of a computer system 600 that includes the memory module 100. Computer system 600 can correspond to a computing device including, but not limited to, a server, a workstation computer, a desktop computer, a laptop computer, and/or a tablet computer.

The computer system 600 includes a system on chip (SOC or SoC) 604 which combines processor, graphics, memory, and Input/Output (I/O) control logic into one SoC package. The SoC 604 includes at least one Central Processing Unit (CPU) module 608, a memory controller 202, and a Graphics Processor Unit (GPU) 610. In other embodiments, the memory controller 202 can be external to the SoC 604. The CPU module 608 includes at least one processor core 602, and a level 2 (L2) cache 606.

Although not shown, each of the processor core(s) 602 can internally include one or more instruction/data caches, execution units, prefetch buffers, instruction queues, branch address calculation units, instruction decoders, floating point units, retirement units, etc. The CPU module 608 can correspond to a single core or a multi-core general purpose processor, such as those provided by Intel® Corporation, according to one embodiment.

The Graphics Processor Unit (GPU) 610 can include one or more GPU cores and a GPU cache which can store graphics related data for the GPU core. The GPU core can internally include one or more execution units and one or more instruction and data caches. Additionally, the Graphics Processor Unit (GPU) 610 can contain other graphics logic units that are not shown in FIG. 6, such as one or more vertex processing units, rasterization units, media processing units, and codecs.

Within the I/O subsystem 612, one or more I/O adapter(s) 616 are present to translate a host communication protocol utilized within the processor core(s) 602 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 616 can communicate with external I/O devices 624 which can include, for example, user interface device(s) including a display and/or a touch-screen display 640, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). The display and/or a touch-screen display 640 can be communicatively coupled to the processor in the SoC 604 to display data stored in the memory module 100.

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The memory module 100 can include volatile memory and/or non-volatile memory. A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

An operating system 642 is software that manages computer hardware and software including memory allocation and access to I/O devices. Examples of operating systems include Microsoft® Windows®, Linux®, iOS® and Android®.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A memory module comprising:
a memory integrated circuit; and
a power management integrated circuit communicatively coupled to the memory integrated circuit, the power management integrated circuit including a voltage regulator and
a non-volatile memory to store a power fail status of the voltage regulator from a prior power cycle, the power management integrated circuit to electrically isolate the memory module dependent on the power fail status of the voltage regulator.

2. The memory module of claim 1, further comprising:
a sideband bus to communicatively couple the power management integrated circuit to a memory controller, the memory controller to access the power fail status from the prior power cycle via the sideband bus.

3. The memory module of claim 2, wherein the power management integrated circuit to float a tri-state power good signal coupled to the memory controller to electrically isolate the memory module if the power fail status is a fatal error.

4. The memory module of claim 2, wherein the voltage regulator to supply power on a power rail to the memory integrated circuit in response to an enable power request received via the sideband bus from the memory controller if the power fail status is not a fatal error.

5. The memory module of claim 2, wherein a failure threshold for one or more of over temperature, over current, over voltage, or under voltage is configured in the power management integrated circuit.

6. The memory module of claim 2, wherein the power management integrated circuit to float a tri-state power good signal coupled to the memory controller to electrically isolate the memory module if the power fail status is good and the power fail status of another memory module coupled to the tri-state power good signal is a fatal error.

7. The memory module of claim 2, wherein the memory module is a dual inline memory module.

8. A memory controller comprising:
Input/Output circuitry to exchange signals on signal lines between the memory controller and a memory module;
a sideband bus; and
a memory module initialization controller to communicate with the memory module via the sideband bus, the memory module initialization controller to read a power fail status of a voltage regulator in the memory module from a prior power cycle from one or more error log registers in the memory module and to electrically isolate the memory module dependent on the power fail status of the voltage regulator.

9. The memory controller of claim 8, wherein the memory module to float a tri-state power good signal coupled to the memory controller to electrically isolate the memory module.

10. The memory controller of claim 8, wherein the voltage regulator to supply power on a power rail to a memory integrated circuit on the memory module in response to an enable power request received via the sideband bus from the memory controller if the power fail status is not a fatal error.

11. The memory controller of claim 8, wherein the memory module initialization controller to configure a failure threshold for one or more of over temperature, over current, over voltage, or under voltage in the memory module.

12. The memory controller of claim 8, wherein the memory module to float a tri-state power good signal coupled to the memory controller to electrically isolate the memory module if the power fail status is good and the power fail status of another memory module coupled to the tri-state power good signal is a fatal error.

13. A system comprising:
a memory controller; and
a memory module, the memory module comprising:
a memory integrated circuit; and
a power management integrated circuit communicatively coupled to the memory integrated circuit, the power management integrated circuit including a voltage regulator and
a non-volatile memory to store a power fail status of the voltage regulator from a prior power cycle, the power management integrated circuit to electrically isolate the memory module dependent on the power fail status of the voltage regulator.

14. The system of claim 13, further comprising:
a sideband bus to communicatively couple the power management integrated circuit to the memory controller, the memory controller to access the power fail status from the prior power cycle via the sideband bus.

15. The system of claim 14, wherein the power management integrated circuit to float a tri-state power good signal coupled to the memory controller to electrically isolate the memory module if the power fail status is a fatal error.

16. The system of claim 14, wherein the voltage regulator to supply power on a power rail to the memory integrated circuit in response to an enable power request received via the sideband bus from the memory controller if the power fail status is not a fatal error.

17. The system of claim 14, wherein a failure threshold for one or more of over temperature, over current, over voltage, or under voltage is configured in the power management integrated circuit.

18. The system of claim 14, wherein the power management integrated circuit to float a tri-state power good signal coupled to the memory controller to electrically isolate the memory module if the power fail status is good and the power fail status of another memory module coupled to the tri-state power good signal is a fatal error.

19. The system of claim 14, wherein the memory module is a dual inline memory module.

20. The system of claim 14, further comprising one or more of:
a display communicatively coupled to a processor to display data stored in the memory module.

* * * * *